Figure 1:
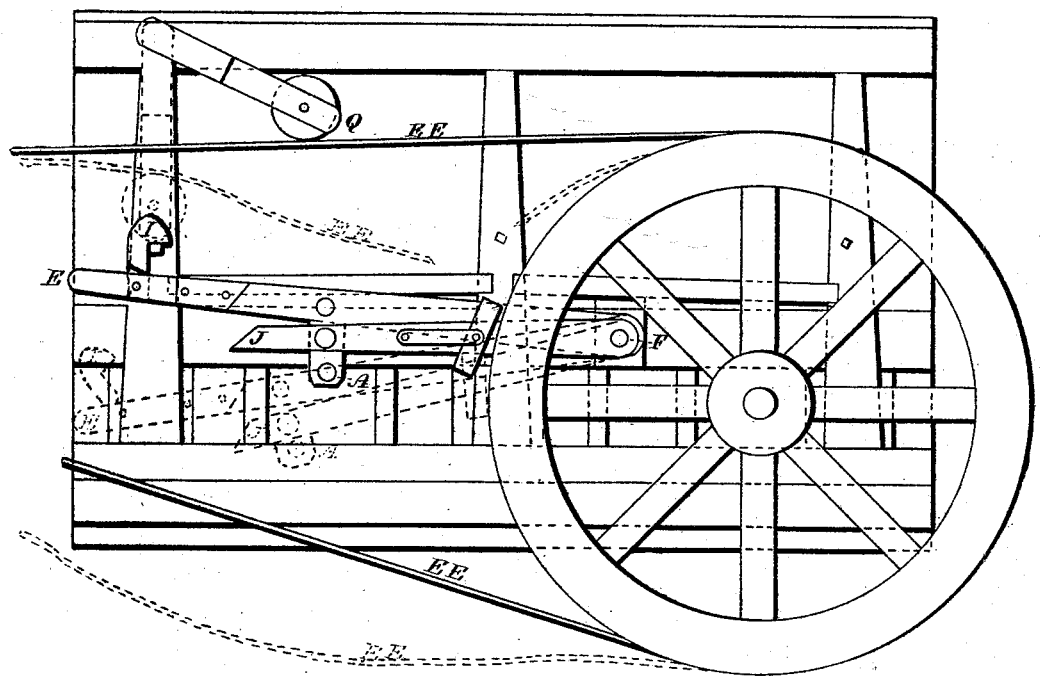

H. N. FARLEY.
Automatic Horse-Power Brakes.

No. 151,110. Patented May 19, 1874.

Witnesses.
Isaac Farley
Benjamin H. Atchley.

Inventor.
Howard N. Farley.

UNITED STATES PATENT OFFICE.

HOWARD N. FARLEY, OF TITUSVILLE, NEW JERSEY.

IMPROVEMENT IN AUTOMATIC HORSE-POWER BRAKES.

Specification forming part of Letters Patent No. 151,110, dated May 19, 1874; application filed May 27, 1873.

*To all whom it may concern:*

Be it known that I, HOWARD N. FARLEY, of Titusville, in the county of Mercer and State of New Jersey, have invented an Improved Automatic Horse-Power Brake and Belt-Tightener, of which the following is a specification:

The object of my invention is to tighten the belt on a horse-power, and stop the same in case the belt should break or come off.

The brake consists of a lever, E, to which is attached a lever, J, which is movable on a bolt at F, and is adjusted by the peg in J and holes in the arm A, the adjustment of the lever changing the power of the brake on the wheel. On the end of the lever E is a hook, I, resting on a peg, as shown in the drawing. The tightener is a frame carrying a roller, Q, which rests on the belt at E E.

Should the belt break or come off, the tightener, by its weight, drops, detaching the hook from the peg, allowing the brake to act on the wheel.

I claim as my invention—

The combination of the two levers with the arm and hook forming the brake.

HOWARD N. FARLEY.

Witnesses:
ISAAC FARLEY,
BENJAMIN H. ATCHLEY.